US012592446B2

(12) United States Patent
Jung

(10) Patent No.: US 12,592,446 B2
(45) Date of Patent: Mar. 31, 2026

(54) BATTERY PACK INCLUDING HEAT INSULATING SHEET AND FRICTION SHEET

(71) Applicant: Samsung SDI Co., Ltd., Yongin-si (KR)

(72) Inventor: Baeckgi Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 223 days.

(21) Appl. No.: 17/499,490

(22) Filed: Oct. 12, 2021

(65) Prior Publication Data

US 2022/0115734 A1     Apr. 14, 2022

(30) Foreign Application Priority Data

Oct. 12, 2020    (KR) ........................ 10-2020-0131282

(51) Int. Cl.
| | |
|---|---|
| *H01M 50/293* | (2021.01) |
| *H01M 10/04* | (2006.01) |
| *H01M 10/658* | (2014.01) |
| *H01M 50/209* | (2021.01) |
| *H01M 50/264* | (2021.01) |

(52) U.S. Cl.
CPC ..... *H01M 50/293* (2021.01); *H01M 10/0481* (2013.01); *H01M 10/658* (2015.04); *H01M 50/209* (2021.01); *H01M 50/264* (2021.01)

(58) Field of Classification Search
CPC ................................................ H01M 10/659
See application file for complete search history.

(56) References Cited

U.S. PATENT DOCUMENTS

| | | |
|---|---|---|
| 8,642,206 B2 | 2/2014 | Kim et al. |
| 2005/0123828 A1 | 6/2005 | Oogami et al. |
| 2008/0138698 A1 | 6/2008 | Ogami et al. |
| 2012/0183841 A1 | 7/2012 | Byun et al. |
| 2016/0204392 A1* | 7/2016 | Kim .................... H01M 10/058 |
| | | 429/185 |

(Continued)

FOREIGN PATENT DOCUMENTS

| | | |
|---|---|---|
| CN | 102569690 A | 7/2012 |
| EP | 3 790 101 A1 | 3/2021 |

(Continued)

OTHER PUBLICATIONS

Korean Office action dated Mar. 22, 2022 issued in corresponding KR Patent Application No. 10-2020-0131282, 4 pages.

(Continued)

*Primary Examiner* — Barbara L Gilliam
*Assistant Examiner* — Jordan E Berresford
(74) *Attorney, Agent, or Firm* — Womble Bond Dickinson (US) LLP

(57) ABSTRACT

A battery pack includes a plurality of battery cells arranged in a longitudinal direction, a heat insulating sheet between two adjacent battery cells of the plurality of battery cells, a first friction sheet located between the heat insulating sheet and a first battery cell of the two adjacent battery cells and including non-adhesive surfaces in direct contact with the heat insulating sheet and the first battery cell, and a restrainer configured to provide a compressive force in the longitudinal direction from opposite ends of the plurality of battery cells.

20 Claims, 7 Drawing Sheets

(56) References Cited

U.S. PATENT DOCUMENTS

| | | | | |
|---|---|---|---|---|
| 2017/0125865 A1* | 5/2017 | Mascianica | ....... | H01M 10/6567 |
| 2019/0020079 A1 | 1/2019 | Lee et al. | | |
| 2020/0313146 A1 | 10/2020 | Busacca et al. | | |
| 2021/0074970 A1 | 3/2021 | Kim et al. | | |
| 2022/0166086 A1* | 5/2022 | Kogami | .............. | H01M 50/291 |

FOREIGN PATENT DOCUMENTS

| | | | |
|---|---|---|---|
| JP | 2005-116429 A | 4/2005 | |
| JP | 2008-091206 A | 4/2008 | |
| JP | 2014-157722 A | 8/2014 | |
| KR | 10-2005-0035112 A | 4/2005 | |
| KR | 10-1222415 | 1/2013 | |
| KR | 10-2019-0008728 | 1/2019 | |
| WO | WO 2019/099642 A2 | 5/2019 | |
| WO | WO 2020/194938 A1 | 10/2020 | |

OTHER PUBLICATIONS

Extended European Search Report dated Mar. 7, 2022 issued in corresponding EP Application No. 21202263.6, 8 pages.
Chinese Office Action dated Dec. 21, 2023 issued in corresponding Chinese Patent Application No. 202111187893.1 (22, pages, including 14 pages of English translation).

* cited by examiner

BATTERY PACK INCLUDING HEAT INSULATING SHEET AND FRICTION SHEET

CROSS-REFERENCE TO RELATED APPLICATION

This application claims priority to and the benefit of Korean Patent Application No. 10-2020-0131282, filed on Oct. 12, 2020 in the Korean Intellectual Property Office, the entire disclosure of which is incorporated by reference herein.

BACKGROUND

1. Field

Aspects of embodiments of the present disclosure relate to a battery pack.

2. Description of the Related Art

In general, secondary batteries may be charged and discharged, unlike primary batteries that may not be charged. The secondary batteries may be used as energy sources for mobile devices, electric vehicles, hybrid vehicles, electric bicycles, uninterruptible power supplies, etc., and may each be used in the form of a single battery cell, depending on the type of external devices, or in the form of a battery pack bundled as a unit by connecting a plurality of battery cells to each other.

Small mobile devices, such as cell phones, may operate for a certain period of time with an output and capacity of a single battery, but when a long-time operation and a high-power operation are required for a battery used, for example, for an electric vehicle or a hybrid vehicle that consumes much power, a battery pack is usually used due to problems of the output and capacity, and the battery pack may increase an output voltage or an output current according to the number of built-in battery cells.

SUMMARY

According to an aspect of one or more embodiments of the present disclosure, a battery pack including a plurality of battery cells reduces an assembly cost and assembly time for assembling a large number of battery cells, while strengthening lateral stiffness and increasing impact resistance against an external impact applied in a transverse direction intersecting a longitudinal direction in which the battery cells are arranged.

Additional aspects will be set forth, in part, in the description which follows and, in part, will be apparent from the description, or may be learned by practice of the presented embodiments of the disclosure.

A battery pack according to one or more embodiments of the present disclosure includes: a plurality of battery cells arranged in a longitudinal direction; a heat insulating sheet between two adjacent battery cells of the plurality of battery cells; a first friction sheet located between the heat insulating sheet and a first battery cell of the two adjacent battery cells and including non-adhesive surfaces in direct contact with the heat insulating sheet and the first battery cell; and a restrainer configured to provide a compressive force in the longitudinal direction from opposite ends of the plurality of battery cells.

In one or more embodiments, the battery pack may further include a second friction sheet located between the heat insulating sheet and a second battery cell of the two adjacent battery cells and including a non-adhesive surface in direct contact with the heat insulating sheet and an adhesive surface facing the second battery cell.

In one or more embodiments, the first friction sheet and the second friction sheet may be alternately arranged in an alternating order in the longitudinal direction.

In one or more embodiments, the first friction sheet and the second friction sheet may be between the two adjacent battery cells, the first friction sheet may be between the heat insulating sheet and the first battery cell, and the second friction sheet may be between the heat insulating sheet and the second battery cell.

In one or more embodiments, the batter pack may further include an adhesive member between the second friction sheet and the second battery cell.

In one or more embodiments, the first friction sheet may include a central opening and an edge portion around the central opening.

In one or more embodiments, the edge portion may have a closed shape surrounding the central opening.

In one or more embodiments, a battery cell of the plurality of battery cells may include an electrode assembly and a casing member configured to accommodate the electrode assembly, and the casing member may include an upper surface on which an electrode terminal electrically connected to the electrode assembly is located, a bottom surface opposite to the upper surface, a pair of main surfaces connecting the upper surface to the bottom surface, and a pair of side surfaces that connect the upper surface to the bottom surface and are narrower than the main surfaces.

In one or more embodiments, the edge portion of the first friction sheet may face the pair of main surfaces of the casing member and extend along edges of the pair of main surfaces.

In one or more embodiments, the edge portion of the first friction sheet may include an upper portion at a position adjacent to the upper surface of the casing member, a bottom portion at a position adjacent to the bottom surface of the casing member, and side portions at positions adjacent to the side surfaces of the casing member.

In one or more embodiments, the upper portion and the side portions of the edge portion may be located so as not to overlap the electrode assembly, and the bottom portion of the edge portion may be located to overlap the electrode assembly.

In one or more embodiments, the upper portion and the side portions of the edge portion may be located to overlap the central opening of the first friction sheet.

In one or more embodiments, a friction coefficient between the first friction sheet and a battery cell of the plurality of battery cells may be in a range of about 0.2 to about 0.8.

In one or more embodiments, the first friction sheet may include at least one of silicone, polyurethane, thermoplastic polyurethane (TPU), and a pressure sensitive adhesive (PSA).

In one or more embodiments, the battery pack may further include a second friction sheet located between the heat insulating sheet and a second battery cell of the two adjacent battery cells and including a non-adhesive surface in direct contact with the heat insulating sheet and an adhesive surface facing the second battery cell, and the first friction sheet and the second friction sheet may be formed of a same material and have a same shape.

In one or more embodiments, the heat insulating sheet may face an entire main surface of the first battery cell.

In one or more embodiments, the heat insulating sheet may include one of mica and aerogel.

In one or more embodiments, the restrainer may include plates surrounding the plurality of battery cells arranged in the longitudinal direction.

In one or more embodiments, the restrainer may include a pair of end plates arranged outside outermost battery cells of the plurality of battery cells in the longitudinal direction, and a pair of side plates extending in the longitudinal direction to connect the pair of end plates to each other.

In one or more embodiments, the compressive force provided by the restrainer in the longitudinal direction may be in a range of about 2000 N to about 5000 N.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
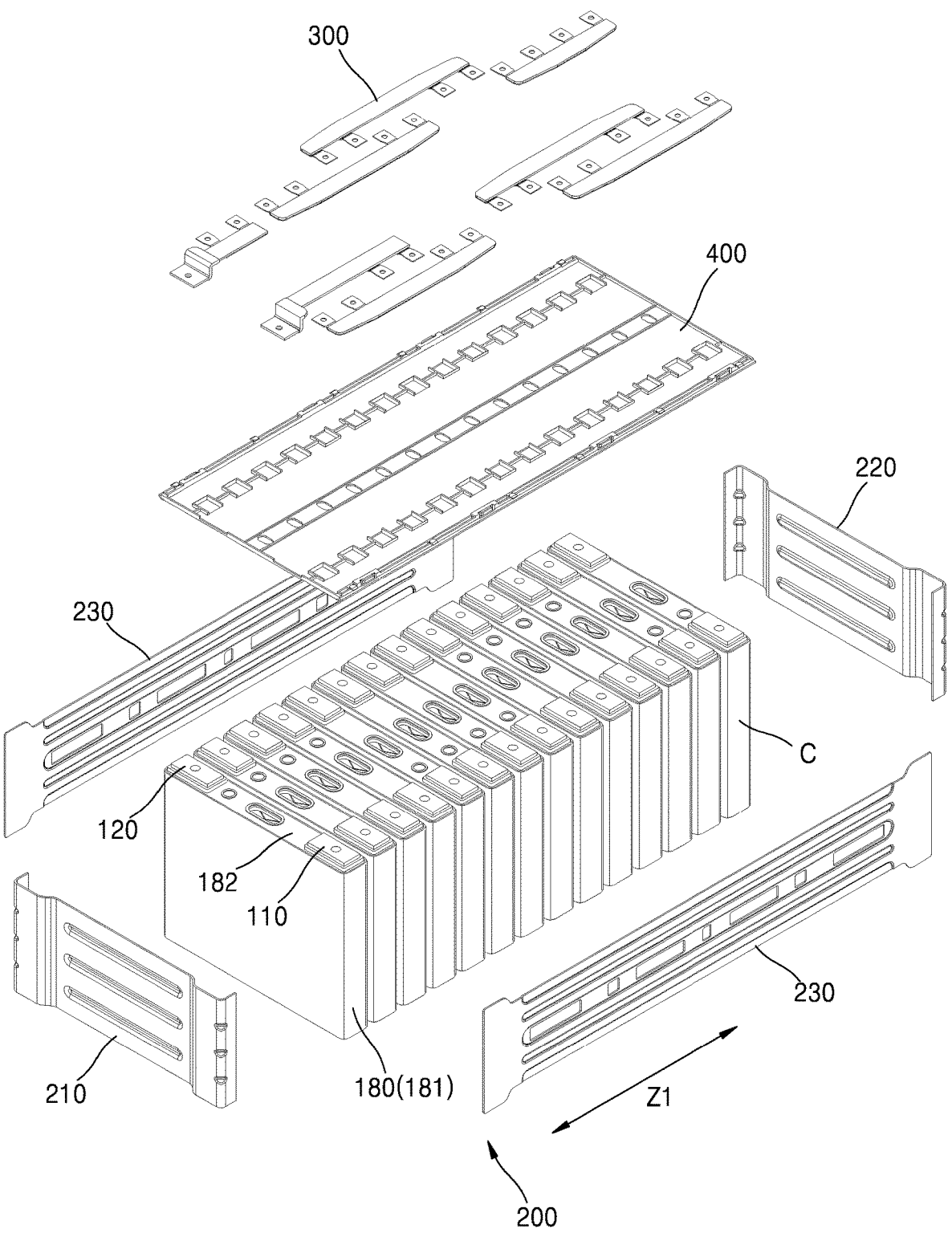
FIG. 1 is an exploded perspective view of a battery pack according to an embodiment of the present disclosure.

Reference will now be made in further detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

Sizes of components in the drawings may be exaggerated for convenience of description. In other words, since the sizes and thicknesses of components in the drawings may be arbitrarily illustrated for convenience of description, the following embodiments are not limited thereto.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, a battery pack according to one or more embodiments of the present disclosure will be described with reference to the accompanying drawings.

Figure 2:
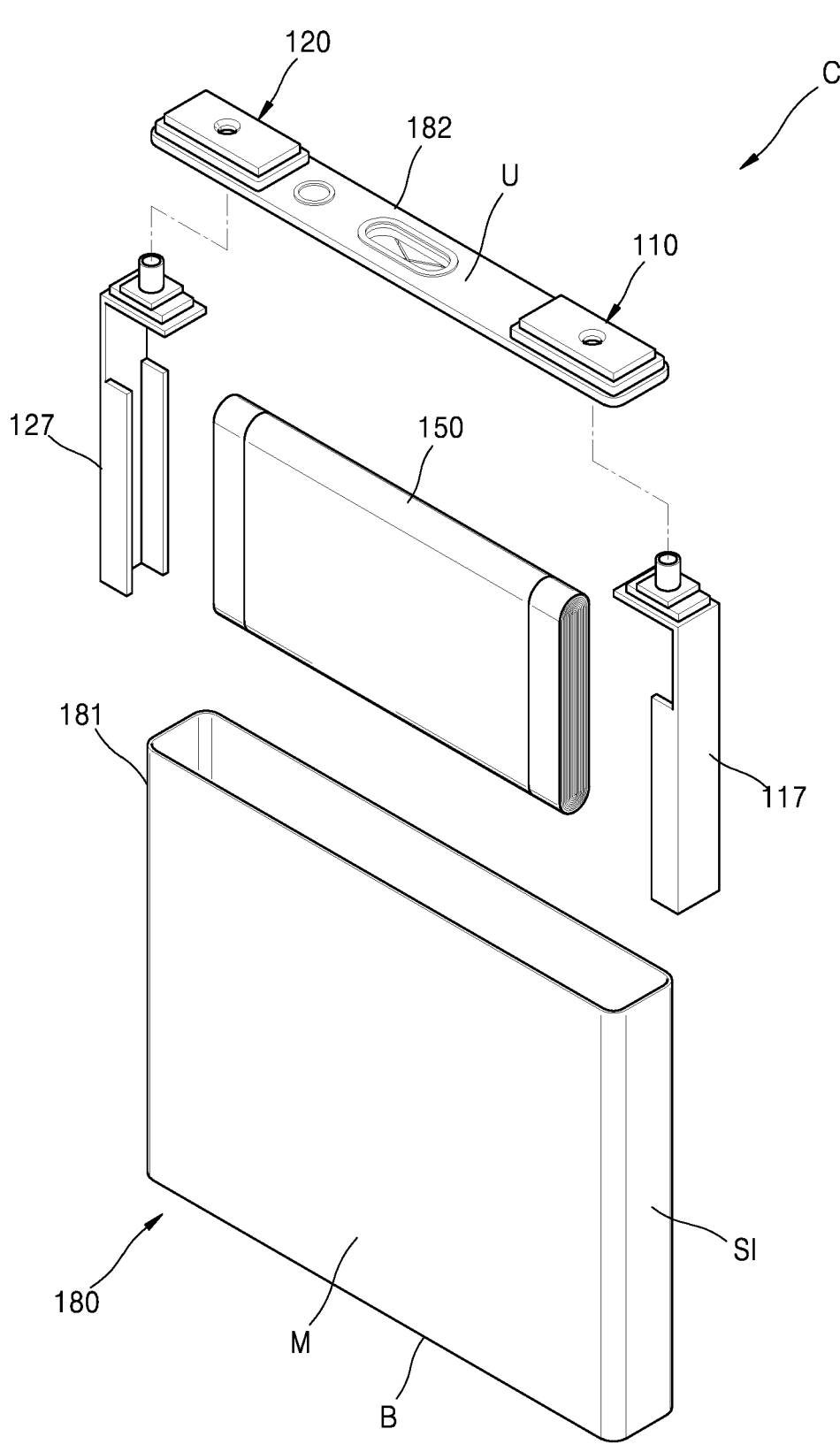
FIGS. 2 and 3 respectively illustrate an exploded perspective view and a cross-sectional view of a battery cell illustrated in FIG. 1.
Figure 3:
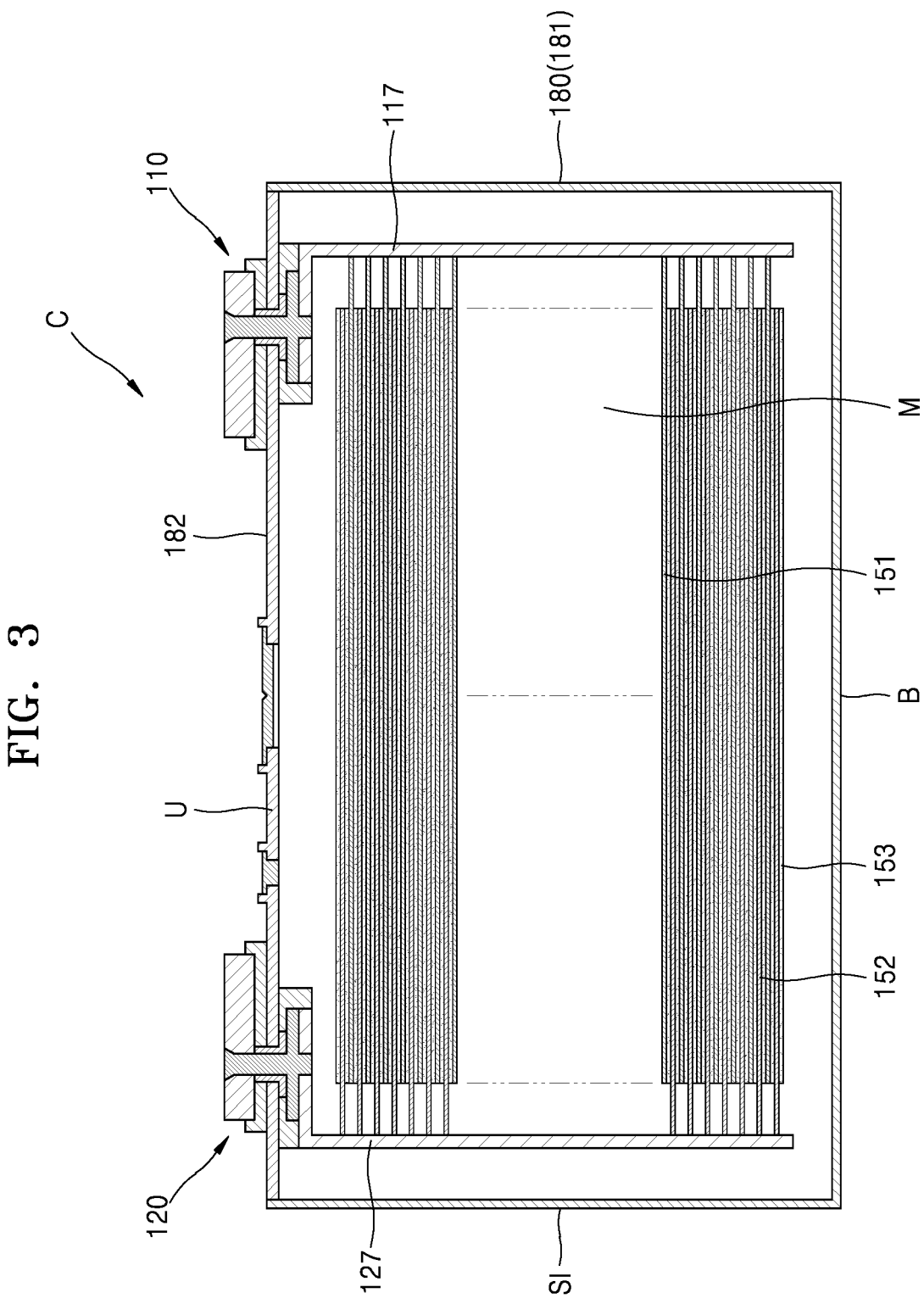

FIG. 1 is an exploded perspective view of a battery pack according to an embodiment of the present disclosure; FIGS. 2 and 3 respectively illustrate an exploded perspective view and a cross-sectional view of a battery cell illustrated in FIG. 1; and FIGS. 4 and 5 are perspective views illustrating a friction sheet between battery cells illustrated in FIG. 1.

Referring to FIG. 1, a battery pack according to the present disclosure may include a plurality of battery cells C arranged in a longitudinal direction Z1, a bus bar 300 for electrically connecting the plurality of battery cells C, and a bus bar holder 400 between the plurality of battery cells C and the bus bar 300.

Figure 4:
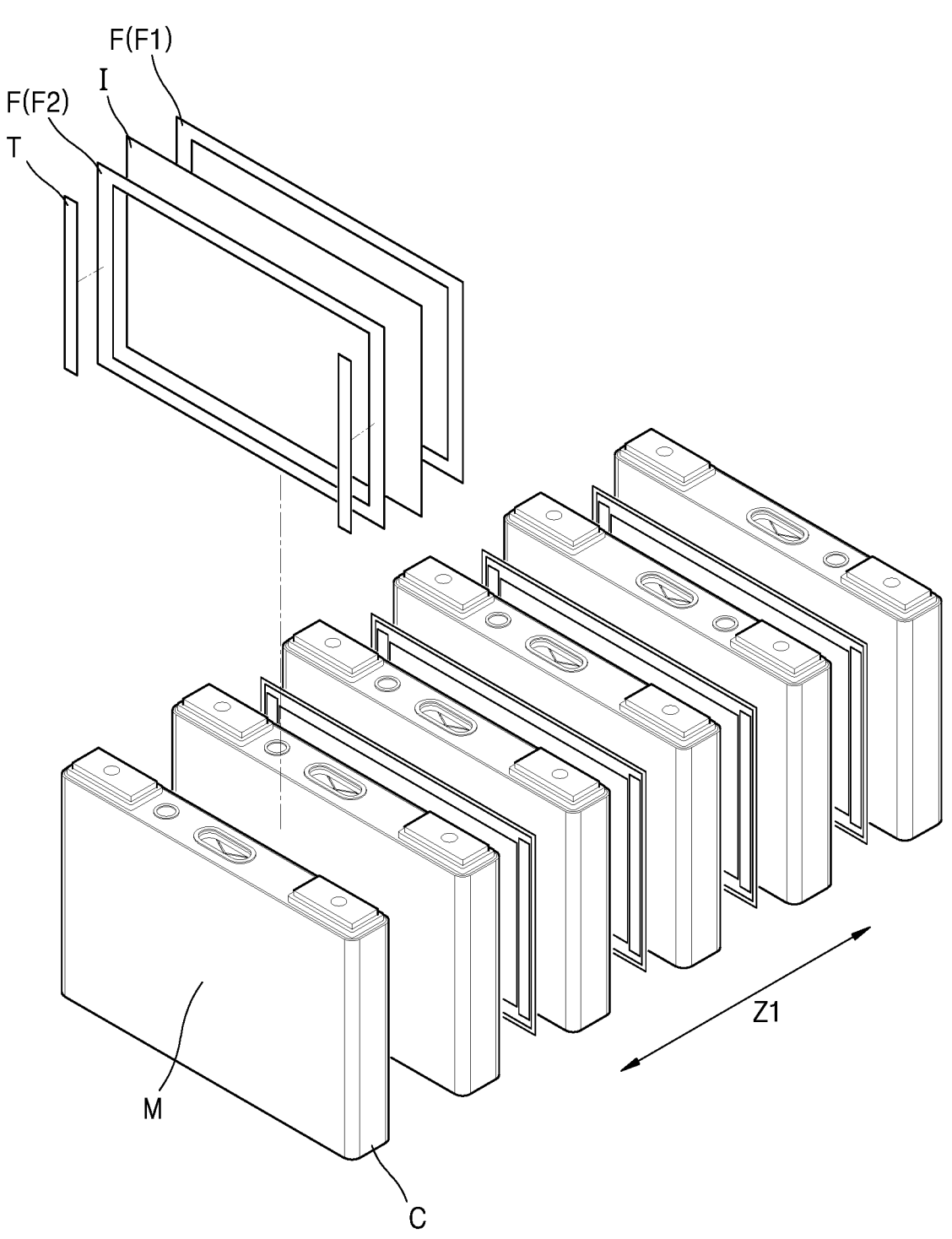
FIGS. 4 and 5 are perspective views illustrating a friction sheet between battery cells illustrated in FIG. 1.
Figure 5:
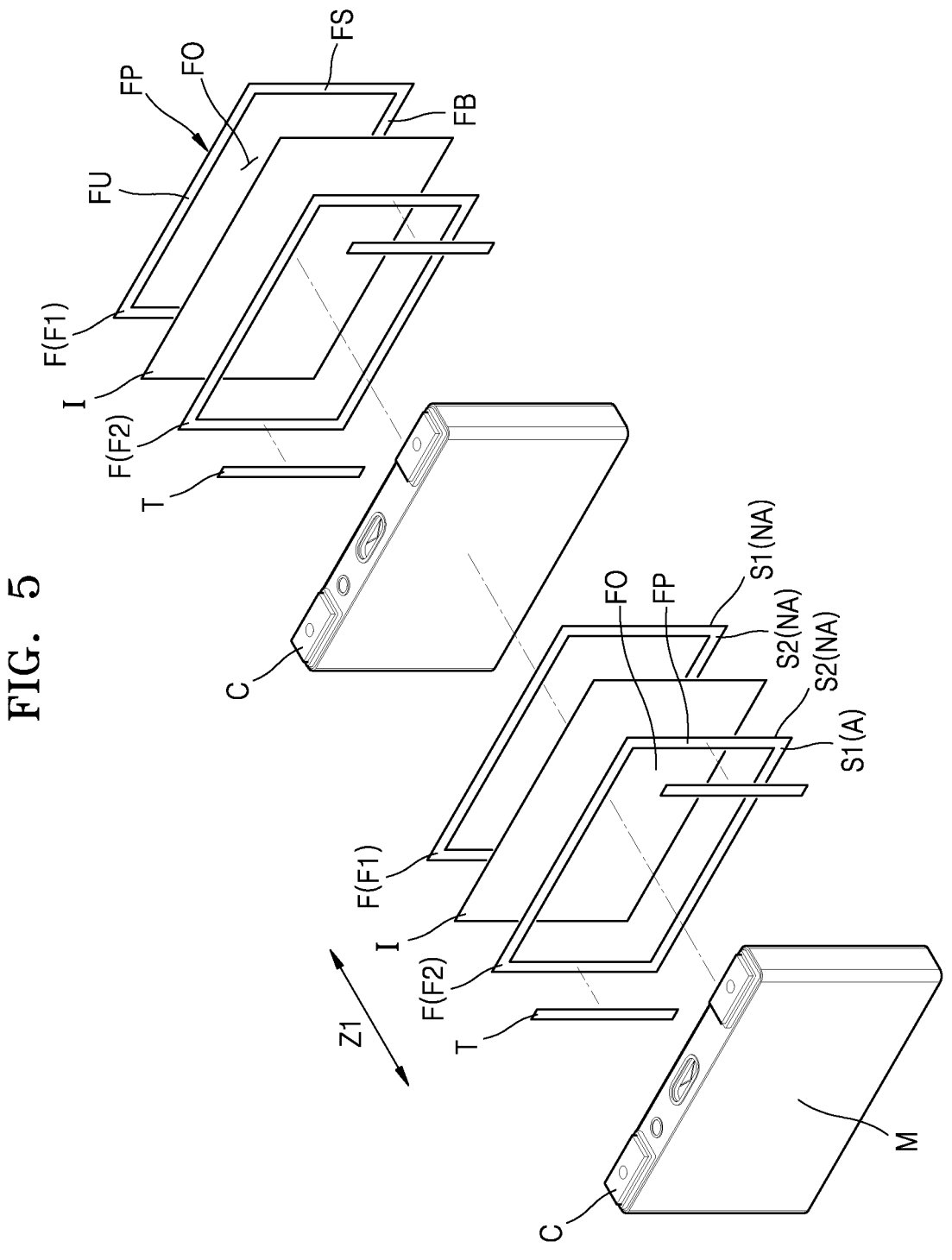

Referring to FIGS. 4 and 5, the battery pack according to the present disclosure may include a heat insulating sheet I between adjacent battery cells C along the longitudinal direction Z1, a first friction sheet F1 that is placed between the heat insulating sheet I and the battery cell C and has non-adhesive surfaces NA on both sides thereof in direct contact with the heat insulating sheet I and the battery cell C, and a restraining mechanism, or restrainer, 200 (see FIG. 1) to provide a compressive force along the longitudinal direction Z1 from both, or opposite, ends of the plurality of cells C. The first friction sheet F1 will be described below in further detail.

Referring to FIGS. 2 and 3, the battery cell C may include an electrode assembly 150 and a casing member 180 that accommodates the electrode assembly 150. For example, in an embodiment of the present disclosure, the electrode assembly 150 may include first and second electrode plates 151 and 152 and a separator 153 between the first and second electrode plates 151 and 152, and the casing member 180 may include a metal can, or case, such as of aluminum. In an embodiment of the present disclosure, the casing member 180 may include a can 181 having an upper portion open to accommodate the electrode assembly 150, and a cap plate 182 for sealing the open upper portion of the can 181.

The casing member 180 may include an upper surface U on which electrode terminals 110 and 120 electrically connected to the electrode assembly 150 are formed, a bottom surface B opposite to the upper surface U, a pair of main surfaces M that connect the upper surface U to the bottom surface B and are formed to have a relatively large area, and a pair of side surfaces SI formed to have a relatively small area (e.g., smaller than that of the main surfaces M). For example, the plurality of battery cells C arranged in the longitudinal direction Z1 may be arranged such that the main surfaces M face each other. The casing member 180 may form an external shape of each of the plurality of battery cells C, and throughout the present specification, the upper surface U, the bottom surface B, the main surfaces M, and the side surfaces SI of the casing member 180 may correspond to an upper surface U, a bottom surface B, main surfaces M, and side surfaces SI of each of the plurality of battery cells C. In addition, throughout the present specification, portions of the electrode assembly 150 adjacent to the top surface U, the bottom surface B, and the side surfaces SI of each of the plurality of battery cells C are respectively referred to as an upper portion, a bottom portion, and side portions of the electrode assembly 150.

Referring to FIGS. 4 and 5, the heat insulating sheet I and a friction sheet F may be between a pair of the battery cells C adjacent to each other in the longitudinal direction Z1 in which the plurality of battery cells C are arranged. As used herein, "friction sheet F" may be used to refer to the first friction sheet F1 or a second friction sheet F2. For example, the heat insulating sheet I may be between the pair of adjacent battery cells C, a friction sheet F may be between the heat insulating sheet I and a first one of the pair of battery cells C, and another friction sheet F may be between the heat insulating sheet I and a second one of the pair of adjacent battery cells C. As is described below, the first friction sheet F1 may be between the heat insulating sheet I and a first one of the pair of battery cells C, and the second friction sheet F2 may be between the heat insulating sheet I and a second one of the pair of adjacent battery cells C.

The friction sheet F may include first and second surfaces S1 and S2 on both, or opposite, sides that are between the battery cell C and the heat insulating sheet I in the longitudinal direction Z1 and face the battery cell C and the heat insulating sheet I in the longitudinal direction Z1. More specifically, the friction sheet F may include the first surface S1 facing the battery cell C and the second surface S2 facing the heat insulating sheet I. In this case, at least one of the first and second surfaces S1 and S2 of the friction sheet F may be formed as a non-adhesive surface NA in direct contact with the battery cell C or the heat insulating sheet I. Throughout the present specification, the non-adhesive surface NA may refer to a surface that forms a frictional bond with the battery cell C or the heat insulating sheet I due to a friction force while coming into direct contact with the battery cell C or the heat insulating sheet I without an adhesive member T. In addition, as is described below, an adhesive surface A may refer to a surface that forms an adhesive bond with the battery cell C or the heat insulating sheet I through the adhesive member T. That is, the non-adhesive surface NA and the adhesive surface A of the friction sheet F may be defined according to whether or not the adhesive member T is present between the friction sheet F and the battery cell C or between the friction sheet F and the heat insulating sheet I, and the non-adhesive surface NA that forms a frictional bond and the adhesive surface A that forms an adhesive bond may be defined depending on the type of a bond between the first and second surfaces S1 and S2 of the friction sheet F and the battery cell C, or a bond between the first and second surfaces S1 and S2 of the friction sheet F and the heat insulating sheet I. Here, the adhesive member T may have a form of an adhesive or a shape of a tape and may include, for example, a double-sided tape between the friction sheet F and the battery cell C or between the friction sheet F and the heat insulating sheet I.

For example, in an embodiment of the present disclosure, the non-adhesive surface NA and the adhesive surface A of the friction sheet F may form the first surface S1 facing the battery cell C, and the non-adhesive surface NA of the friction sheet F may be in direct contact with the battery cell C depending on whether or not the adhesive member T is interposed, and the adhesive surface A of the friction sheet F may face the battery cell C through the adhesive member T without being in direct contact with the battery cell C. In an embodiment of the present disclosure, the second surface S2 of the friction sheet F may be formed as the non-adhesive surface NA in direct contact with the heat insulating sheet I.

In an embodiment of the present disclosure, the friction sheet F may include the first friction sheet F1 having the first surface S1 formed as the non-adhesive surface NA in direct contact with the battery cell C, and the second friction sheet F2 having the first surface S1 formed as the adhesive surface A facing the battery cell C. That is, the first friction sheet F1 may have the first surface S1 formed as the non-adhesive surface NA in direct contact with the battery cell C, and the second surface S2 formed as the non-adhesive surface NA in direct contact with the heat insulating sheet I. In addition, the second friction sheet F2 may have the first surface S1 formed as the adhesive surface A facing the battery cell C, and the second surface S2 formed as the non-adhesive surface NA in direct contact with the heat insulating sheet I.

The first and second friction sheets F1 and F2 may be alternately arranged in the longitudinal direction Z1 in which the plurality of battery cells C are arranged and may be alternately arranged in an alternating order. For example, the heat insulating sheet I may be between the pair of battery cells C adjacent to each other in the longitudinal direction Z1, and the first friction sheet F1 may be between the heat insulating sheet I and any one of the pair of battery cells C, and the second friction sheet F2 may be between the heat insulating sheet I and the other of the pair of battery cells C.

The first and second friction sheets F1 and F2 are described in further detail as follows. That is, the first friction sheet F1 may have the first and second surfaces S1 and S2 formed as the non-adhesive surfaces NA, which are respectively in direct contact with the battery cell C and the heat insulating sheet I, between the battery cell C and the heat insulating sheet I. The first friction sheet F1 may bond the battery cell C and the heat insulating sheet I together through a frictional bond, and, more specifically, the first friction sheet F1 may bond the battery cell C and the heat insulating sheet I together through the first surface S1 that forms a frictional bond with the battery cell C and the second surface S2 that forms a frictional bond with the heat insulating sheet I. In this case, the frictional bond between the first surface S1 of the first friction sheet F1 and a surface facing the battery cell C may indicate a bond that prevents or substantially prevents relative motion between the first friction sheet F1 and the battery cell C in a transverse direction intersecting the longitudinal direction Z1 due to a friction force proportional to a compressive force of the restraining mechanism 200 (see FIG. 1). In addition, a direction in which the relative motion between the first friction sheet F1 and the battery cell C is prevented or substantially prevented by a friction force, that is, the transverse direction intersecting the longitudinal direction Z1 may indicate all directions on a plane of the surface S1 of the first friction sheet F1. Similarly, a frictional bond between the second surface S2 of the first friction sheet F1 and the surface facing the heat insulating sheet I may indicate a bond that prevents or substantially prevents relative motion between the first friction sheet F1 and the heat insulating sheet I in the transverse direction intersecting the longitudinal direction Z1 due to a friction force proportional to a compressive force of the restraining mechanism 200 (see FIG. 1).

The second friction sheet F2 may have the first surface S1 formed as the adhesive surface A that forms an adhesive bond with the battery cell C, and the second surface S2 formed as the non-adhesive surface NA that forms a frictional bond with the heat insulating sheet I. More specifically, the second friction sheet F2 may bond the battery cell C and the heat insulating sheet I together through the first surface S1 that forms an adhesive bond with the battery cell C, and the second surface S2 that forms a frictional bond with the heat insulating sheet I. In this case, the adhesive bond between the first surface S1 of the second friction sheet F2 and the surface facing the battery cell C may indicate a bond that prevents or substantially prevents relative motion between the second friction sheet F2 and the battery cell C in the transverse direction intersecting the longitudinal direction Z1 due to an adhesive force of the adhesive member T between the first surface S1 of the second friction sheet F2 and the battery cell C. In this case, the direction in which the relative motion between the second friction sheet F2 and the battery cell C is prevented or substantially prevented by the adhesive force of the adhesive member T, that is, the transverse direction intersecting the longitudinal direction Z1 may indicate all directions on a plane of the first surface S1 of the second friction sheet F2.

In addition, a frictional bond between the second surface S2 of the second friction sheet F2 and the surface facing the heat insulating sheet I may indicate a bond that prevents or substantially prevents relative motion between the second friction sheet F2 and the heat insulating sheet I in the transverse direction intersecting the longitudinal direction Z1 due to a friction force proportional to the compressive force of the restraining mechanism 200 (see FIG. 1). In this case, a direction in which relative motion between the second friction sheet F2 and the heat insulating sheet I is prevented or substantially prevented by a friction force of the second friction sheet F2, that is, the transverse direction intersecting the longitudinal direction Z1 may indicate all directions on a plane of the second surface S2 of the second friction sheet F2.

Referring to FIG. 1, the battery pack according to an embodiment of the present disclosure may include the restraining mechanism 200 for binding the plurality of battery cells C arranged in the longitudinal direction Z1 in the form of a pack. Throughout the present specification, the restraining mechanism 200 may indicate a structure for binding the plurality of battery cells C in the longitudinal direction Z1. In addition, the restraining mechanism 200 may indicate a structure for applying a friction force to the non-adhesive surface NA of the friction sheet F for restricting the plurality of battery cells C in the transverse direction intersecting the longitudinal direction Z1 That is, the non-adhesive surface NA of the friction sheet F forms a frictional bond with the battery cell C or the heat insulating sheet I in direct contact therewith and forms a frictional bond through a friction force proportional to the compressive force provided by the restraining mechanism 200 in the longitudinal direction Z1. In this case, the compressive force provided by the restraining mechanism 200 may act as a normal force for the friction sheet F.

Referring to FIGS. 4 and 5, unlike the first friction sheet F1 that forms a frictional bond with the battery cell C, the second friction sheet F2 forms an adhesive bond with the battery cell C. In an embodiment of the present disclosure, there is no need to interpose the adhesive member T between the first friction sheet F1 and the battery cell C, and, thus, a manufacturing cost and assembly time may be reduced.

However, when there are no adhesive members T between all of the battery cells C and the friction sheets F, temporary holding or fixing of the battery cells C and the friction sheets F during an assembly operation may not be made, and, thus, according to an embodiment, the adhesive member T is between the battery cell C and the second friction sheet F2 among the first and second friction sheets F1 and F2 alternately arranged with each other, thereby increasing convenience of assembly during the assembly operation through the temporary fixing between the second friction sheet F2 and the battery cell C.

In an embodiment, the first and second friction sheets F1 and F2 may have a same (same or substantially same) structure. For example, the first and second friction sheets F1 and F2 may be formed of a same (same or substantially same) material and have a same (same or substantially same) shape. There are different frictional bonds and different adhesive bonds between the first friction sheet F1 and the battery cell C and between the second friction sheet F2 and the battery cell C, but there is a same frictional bond between the first friction sheet F1 and the heat insulating sheet I and between the second friction sheet F2 and the heat insulating sheet I, and, thus, the same friction properties may be required for the first and second friction sheets F1 and F2, and when the first and second friction sheets F1 and F2 have different structures, a strict assembly is required to prevent or reduce confusion between the first and second friction sheets F1 and F2 during an assembly operation of the battery pack, which causes inconvenience. As is described below, the first and second friction sheets F1 and F2 may be formed to face the main surfaces M of the battery cell C and may be formed to have the same (same or substantially same) shape extending along edges of the main surfaces M.

In an embodiment of the present disclosure, the friction sheet F may be formed of an elastic material that has an appropriate friction coefficient to form a sufficient frictional bond with the battery cell C or the heat insulating sheet I and may be elastically deformed appropriately according to a compressive force provided by the restraining mechanism 200 (see FIG. 1). For example, the friction sheet F may be made of an elastic material having a friction coefficient of about 0.2 to about 0.8, and, in an embodiment of the present disclosure, the friction sheet F may include at least one of silicone, polyurethane, thermoplastic polyurethane (TPU), and a pressure sensitive adhesive (PSA).

The friction sheet F may prevent or substantially prevent relative motion with the battery cell C or the heat insulating sheet I in the transverse direction intersecting the longitudinal direction Z1 while forming a frictional bond with the battery cell C or the heat insulating sheet I, and the entire battery pack including the plurality of battery cells C arranged in the longitudinal direction Z1 with the friction sheets F therebetween may have lateral rigidity. If an external impact is applied in a transverse direction intersecting the longitudinal direction Z1 in which the plurality of battery cells C are arranged, the battery cells C may slide over each other to be out of a regular position. In this case, the fact that the plurality of battery cells C are out of positions due to an external impact may mean that the battery pack operates abnormally due to failure of an electrical coupling, insulation, or so on in which the plurality of battery cells (C) are stably maintained in original positions. However, according to embodiments of the present disclosure, a shape of the battery pack may be prevented or substantially prevented from being deformed due to an external impact, and lateral stiffness may be provided to the battery pack to resist against the external impact in a transverse direction, and, thus, impact resistance is increased.

In order to increase a bonding strength of the friction sheet F directly related to the lateral stiffness of the battery pack, the friction sheet F may have an appropriate friction coefficient, for example, a friction coefficient of about 0.2 to about 0.8. Here, the friction coefficient is a surface characteristic between the friction sheet F and the battery cell C, and, thus, throughout the present specification, the friction coefficient of the friction sheet F may refer to a friction coefficient between the friction sheet F and the battery cell C. Here, the battery cell C may include a can-type battery cell C including a metal can (for example, an aluminum can) as the casing member 180. The friction coefficient is a factor for determining a strength of a frictional bond, and may determine not only a strength of a friction bond between the friction sheet F and the battery cell C but also a strength of a frictional bond between the friction sheet F and the heat insulating sheet I, and a can-type battery cell C using a metal can (for example, an aluminum can) as the casing member 180 has a smooth surface, whereas the insulating sheet I including mica or aerogel, for example, has a rougher surface than the metal can (for example, an aluminum can) as described below, and, thus, when the friction sheet F is within a range of the friction coefficient of the friction sheet F, the friction sheet F may form a sufficient frictional bond with the battery cell C while also forming a sufficient frictional bond with the heat insulating sheet I. For example, the lateral stiffness of the battery pack including the plurality of battery cells C may be affected by the strength of the frictional bond between the friction sheet F and the battery cells C and the strength of the frictional bond between the friction sheet F and the heat insulating sheet I, and the friction sheet F having an appropriate friction coefficient forms a sufficient frictional bond with not only the battery cell C but also the heat insulating sheet I, thereby providing lateral stiffness capable of effectively resisting against an external impact.

When the friction coefficient of the friction sheet F increases, a bonding strength with the battery cell C or the heat insulating sheet I increases by that amount, and, in addition, the friction sheet F having an excessive friction coefficient outside a range of the friction coefficient may lack elasticity that may be elastically deformed according to a compressive force provided by the restraining mechanism 200 (see FIG. 1), and, thus, the range of the friction coefficient may be appropriately limited.

The bonding strength of the friction sheet F and the friction coefficient of the friction sheet F may be affected by the compressive force provided by the restraining mechanism 200 (see FIG. 1) and a contact area between the friction sheet F and the battery cell C. The friction coefficient of the friction sheet F is the same as described above, and, in an embodiment, the compressive force provided by the restraining mechanism 200 (see FIG. 1) may be in a range of 2000 N to 5000 N. In an embodiment, the contact area between the friction sheet F and the battery cell C may be in a range of 3000 mm$^2$ to 6000 mm$^2$. For example, the bonding strength of the friction sheet F may be determined by a friction force expressed in the form of a multiplication of the friction coefficient of the friction sheet F (a friction coefficient between the friction sheet F and the battery cell C), the compressive force (corresponding to a normal force) of the restraining mechanism 200 (see FIG. 1) acting between the friction sheet F and the battery cell C, and the contact area between the friction sheet F and the battery cell C. The friction sheet F forms a frictional bond with not only the battery cell C but also the heat insulating sheet I, and the lateral stiffness of the battery pack including the plurality of battery cells C is affected by the strength of the frictional bond between the friction sheet F and the battery cell C and the strength of the frictional bond between the friction sheet F and the heat insulating sheet I, and the friction sheet F having an appropriate friction coefficient forms a sufficient frictional bond with not only the battery cell C but also the heat insulating sheet I, thereby providing lateral stiffness capable of effectively resisting against an external impact. For example, in an embodiment of the present disclosure, the battery cell C may be provided as a can-type battery cell C using a metal can (for example, an aluminum can) as the casing member 180, the insulating sheet I including mica or aerogel, for example, has a rougher surface than a metal can (for example, an aluminum can), rather than a surface of a metal can having a relatively smooth surface, and, thus, as described above, the friction sheet F having the friction coefficient and a friction area of the metal can may form a sufficient frictional bond with the battery cell C while also forming a sufficient frictional bond with the heat insulating sheet I. In addition, the compressive force provided by the restraining mechanism 200 (see FIG. 1) may be applied to the friction sheet F, the battery cell C, and the heat insulating sheet I arranged in the longitudinal direction Z1 in the same manner as applied between the friction sheet F and the battery cell C and between the friction sheet F and the heat insulating sheet I.

The lateral stiffness of the battery pack including the plurality of battery cells C may be determined by a friction force between the friction sheet F and the battery cell C and the friction force between the friction sheet F and the heat insulating sheet I and may be determined by a friction force between the friction sheet F and the battery cell C having a relatively smooth metal surface (corresponding to a metal can and the casing member 180) rather than a friction force between the friction sheet F and the heat insulating sheet I having a relatively rough surface. For example, a lateral stiffness of a battery pack against an external impact may be limited by the friction force between the friction sheet F and the battery cell C having a smooth metal surface (corresponding to a metal can and the casing member 180) that is relatively vulnerable to a frictional bond. Under the following conditions according to an embodiment of the present disclosure, that is, under the conditions of a friction coefficient (about 0.2 to about 0.8) between the friction sheet F and the battery cell C, a contact area (about 3000 mm$^2$ to about 6000 mm$^2$) between the friction sheet F and the battery cell C, and a compressive force (corresponding to a normal force, about 2000 N to about 5000 N) of the restraining mechanism 200 (see FIG. 1) applied between the friction sheet F and the battery cell C, a friction force expressed in the form of multiplication of the friction coefficient and the contact area and the compressive force may be in a range of about 400 N to about 4000 N, lateral stiffness of a battery pack provided by the friction force in the range may effectively resist against an external impact in the transverse direction approximately equivalent to the above-described range of friction force, and the plurality of battery cells C may be in a regular position in the transverse direction.

Referring to FIG. 1, in an embodiment of the present disclosure, the restraining mechanism 200 may include plates 210, 220, and 230 surrounding the plurality of battery cells C arranged in the longitudinal direction Z1. In an embodiment, the restraining mechanism 200 may include a pair of end plates 210 and 220 arranged on the outside of the battery cells C arranged at the outermost sides in the longitudinal direction Z1, and a pair of side plates 230 extending in the longitudinal direction Z1 to connect the pair of end plates 210 and 220 to each other. The pair of end plates 210 and 220 formed on both, or opposite, sides of the battery pack in the longitudinal direction Z1 may provide a compressive force in the longitudinal direction Z1 to the plurality of battery cells C, and the pair of side plates 230 formed on both sides of the battery pack in the transverse direction may distribute an external impact applied in the transverse direction to the plurality of battery cells C arranged in the longitudinal direction Z1. For example, the side plates 230 may distribute the external impact applied in the transverse direction to the plurality of friction sheets F arranged together with the plurality of battery cells C, thereby allowing the plurality of friction sheets F to resist against an external impact in the transverse direction while exerting a friction force together. In addition, the side plates 230 may be connected to the pair of end plates 210 and 220 such that the pair of end plates 210 and 220 are pressed toward each other in the longitudinal direction Z1, and, thus, a compressive force may be applied to the plurality of battery cells C between the pair of end plates 210 and 220.

In an embodiment, the end plates 210 and 220 and the side plates 230 overlap each other at the four corners of the battery pack to be bonded to each other by fastening screws or welding. In an embodiment of the present disclosure, the restraining mechanism 200 may include the plurality of the plates 210, 220, and 230 surrounding the plurality of battery cells C arranged in the longitudinal direction Z1; however, the restraining mechanism 200 is not limited thereto, and, for example, may be provided in the form of a band surrounding the plurality of battery cells C arranged in the longitudinal direction Z1, and, in various embodiments, the restraining mechanism 200 may bind the plurality of battery cells C arranged in the longitudinal direction Z1 in the form of a pack and may be provided in various forms within a range of providing a compressive force in the longitudinal direction Z1 for a frictional bond of the friction sheets F in the transverse direction.

The restraining mechanism 200 may provide a compressive force in the longitudinal direction Z1 to bind the plurality of battery cells C arranged in the longitudinal direction Z1 in the form of a pack and for the frictional bond of the friction sheets F in the transverse direction. In an embodiment of the present disclosure, the compressive force provided by the restraining mechanism 200 in the longitudinal direction Z1 may be in a range of 2000 N to 5000 N. When the compressive force provided by the restraining mechanism 200 is less than a lower limit value, the compressive force provided by the restraining mechanism 200 is not sufficient and a lateral stiffness of the battery pack provided by the frictional bond of the friction sheet F is insufficient, and, thus, the plurality of battery cells C may be out of a regular position due to an external impact applied in the transverse direction.

When the compressive force provided by the restraining mechanism 200 is excessively provided out of an upper limit value, the plurality of battery cells C may be deformed due to the compressive force provided by the restraining mechanism 200, or the restraining mechanism 200 may not accommodate volume expansion caused by swelling of the battery cells C and an internal stress induced by the volume expansion of the battery cells C may be accumulated therein, and, thus, durability of the restraining mechanism 200 may be affected thereby.

Referring to FIGS. 4 and 5, the heat insulating sheet I may be between the battery cell C and the friction sheet F. The heat insulating sheet I may block a thermal interference between the plurality of battery cells C arranged in the longitudinal direction Z1 and may block or delay heat or ignition of a battery cell C being propagated toward another battery cell C adjacent thereto.

In an embodiment of the present disclosure, the heat insulating sheet I may be formed of any material having a thermal insulation to sufficiently block the thermal interference between the adjacent battery cells C. In an embodiment of the present disclosure, the heat insulating sheet I may include mica or aerogel.

In an embodiment, the aerogel may include silicon dioxide ($SiO_2$) as a main component. In an embodiment, the aerogel particle content in the heat insulating sheet I is 80% or more, and a remainder thereof may be made of a binder. In an embodiment, the aerogel particle content may be comprised of about 80% to about 90%. If the aerogel particle content is less than 80%, heat propagation between the adjacent battery cells C may not be blocked sufficiently, and if the aerogel particle content is greater than 90%, binder content may be relatively small to cause the heat insulating sheet I to be difficult to be formed. In an embodiment, the aerogel particles may have a size of about 10 μm to about 100 μm, and 90% or more of the aerogel particles may be formed in nano-sized pores. As such, in an embodiment of the present disclosure, the heat insulating sheet I has more than 90% of the aerogel particles with nano-sized pores, and, thus, the heat insulating sheet I may have excellent heat insulation performance while being lightweight.

In an embodiment of the present disclosure, the heat insulating sheet I may have a micropore structure formed in a nano-sized composite structure connected by a $SiO_2$ structure, and air may be accommodated in the micropore structure. An air layer may be maintained without moving in the $SiO_2$ composite structure, and, thus, air exhibiting excellent thermal insulation properties may be used as a heat insulator.

The heat insulating sheet I may have a form of a whole sheet and may be formed substantially over the entire main surface M of the battery cell C, and thus insulate between a pair of adjacent battery cells C. Unlike the heat insulating sheet I, the friction sheet F may have a form of a sheet including a central opening FO to extend along an edge region of the main surface M of the battery cell C.

In an embodiment, the friction sheet F may include the central opening FO and an edge portion FP extending in a closed form to surround the central opening FO. The central opening FO formed in the friction sheet F may provide a free space to absorb volume expansion due to swelling of the battery cell C. That is, the volume expansion due to the swelling of the battery cell C may be allowed through the free space provided through the central opening FO, and internal stress due to the swelling of the battery cell C may be reduced, and a durability problem of the restraining mechanism 200 (see FIG. 1) according to accumulation of the internal stress may be solved.

Figure 6:
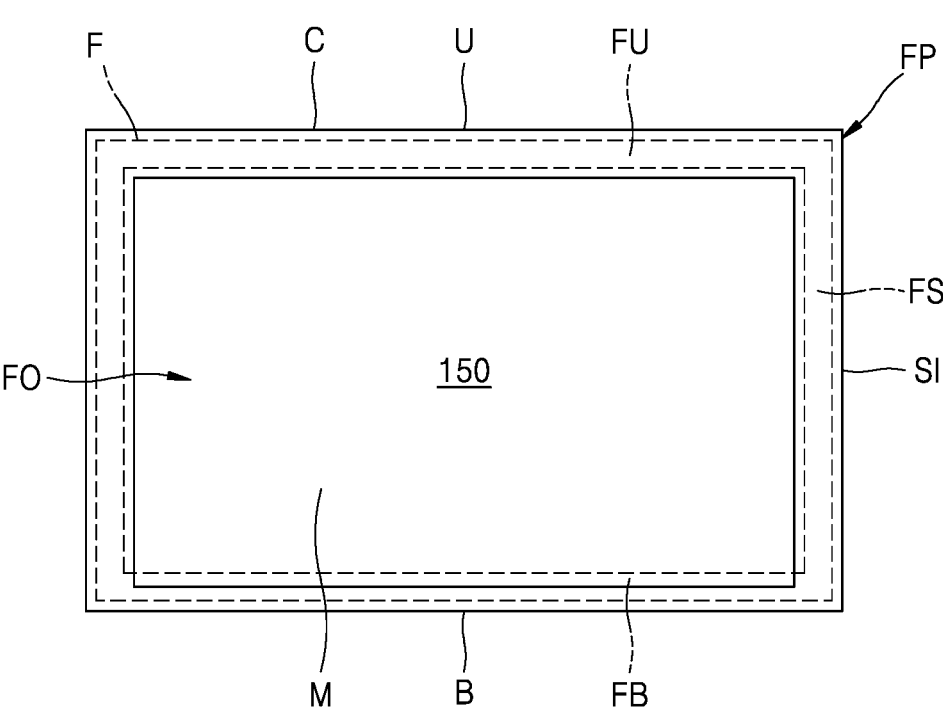
FIG. 6 is a view illustrating an arrangement relationship between a friction sheet and an electrode assembly.

FIG. 6 is a view illustrating an arrangement relationship between a friction sheet and an electrode assembly. In FIG. 6, a detailed illustration of a battery cell is omitted for the sake of clarity and understanding.

The edge portion FP of the friction sheet F may face the main surface M of the battery cell C and extend along an edge of the main surface M and include an upper portion FU adjacent to an upper surface U of the battery cell C, a bottom portion FB adjacent to a bottom surface B of the battery cell C, and side portions FS adjacent to side surfaces SI of the battery cell C. In addition, the upper portion FU and the side portions FS of the friction sheet F may be formed at positions that do not overlap the electrode assembly 150, and the bottom portion FB of the friction sheet F may be formed at a position that overlaps the electrode assembly 150. The arrangement of the friction sheet F may be made by considering heat generation according to a position of the battery cell C and swelling of the battery cell C according thereto.

In an embodiment of the present disclosure, current collectors 117 and 127 (see FIGS. 2 and 3) for electrically connecting the electrode assembly 150 to the electrode terminals 110 and 120 may be connected to a portion (e.g., an upper portion) of the electrode assembly 150, and charging and discharging currents may be concentrated in the collectors 117 and 127 to cause intensive heat generation, and, thus, the upper portion of the electrode assembly 150 connected to the current collectors 117 and 127 may have relatively large heat generation and swelling compared to a bottom portion of the electrode assembly 150. Accordingly, the upper portion of the electrode assembly 150 having relatively large heat generation and swelling may be formed so as not to overlap the upper portion FU of the friction sheet F, and the opening FO of the friction sheet F, rather than the edge portion FP, may be formed at a position overlapping the upper portion of the electrode assembly 150, and, thus, swelling of the upper portion of the electrode assembly 150 may be accommodated. In addition, the bottom portion of the electrode assembly 150 having a relatively small heat generation may overlap the bottom portion FB of the friction sheet F. In addition, the side portions FS adjacent to the upper portion FU of the friction sheet F may not overlap the electrode assembly 150 (side portions FS of the electrode assembly 150), and the opening FO of the friction sheet F rather than the edge portion FP of the friction sheet F may be formed at positions that overlap the side portions of the electrode assembly 150, and, thus, swelling of the side portions of the electrode assembly 150 may be accommodated. As such, the upper portion FU and the side portions FS of the friction sheet F may be formed so as not to overlap the electrode assembly 150, and the bottom portion FB of the friction sheet F may be formed at a position that overlaps the electrode assembly 150.

Figure 7A:
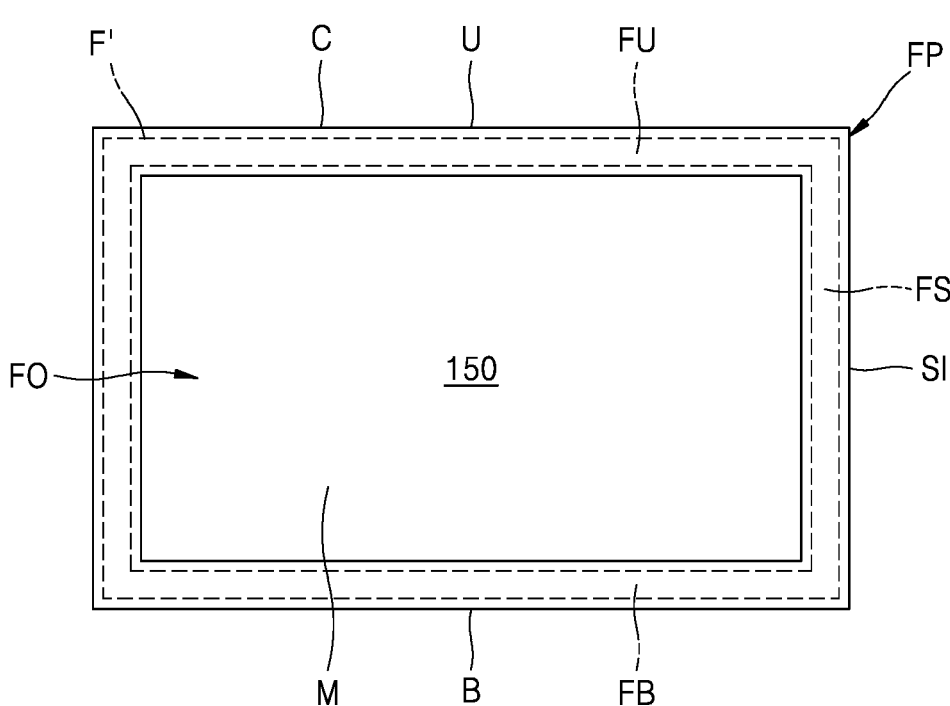
FIGS. 7A to 7C are views illustrating modified embodiments of the friction sheet illustrated in FIG. 6.
Figure 7B:
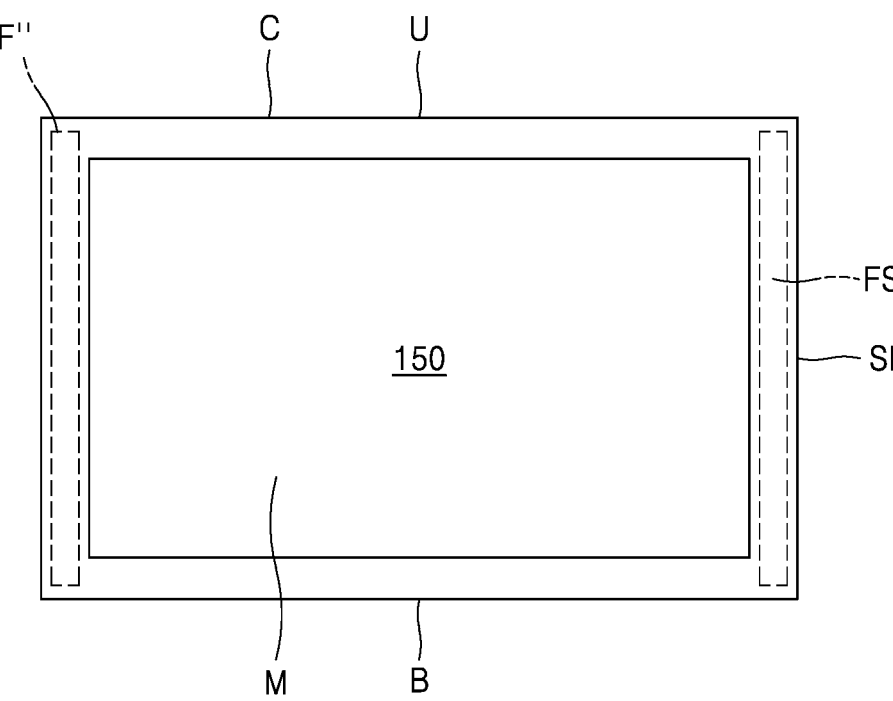
Figure 7C:
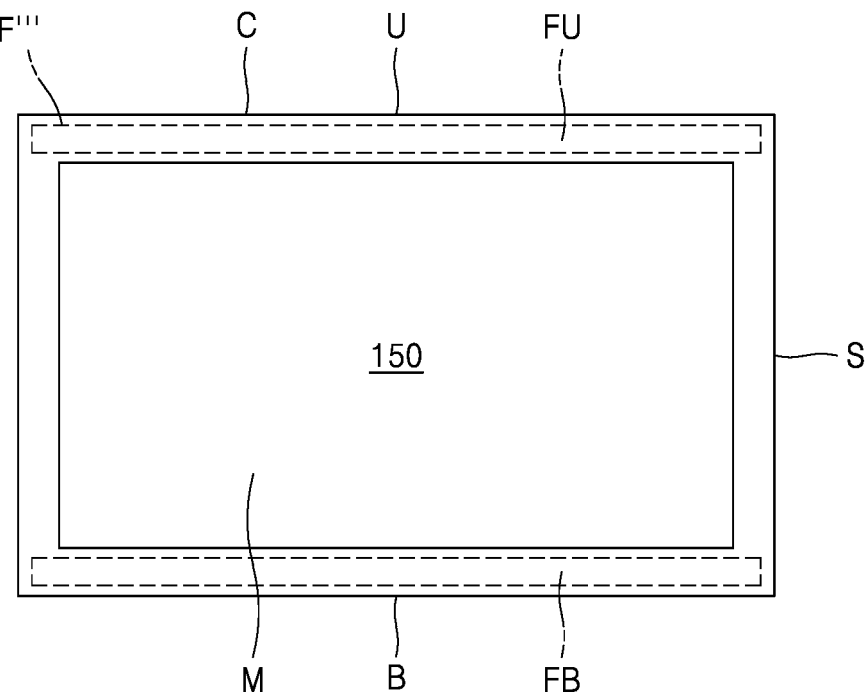

FIGS. 7A to 7C are views illustrating modified embodiments of the friction sheet illustrated in FIG. 6.

In the embodiment illustrated in FIG. 7A, a friction sheet F' may be arranged at a position that does not overlap the electrode assembly 150. That is, an upper portion FU, side portions FS, and a bottom portion FB of the friction sheet F' may be arranged at positions that do not overlap the electrode assembly 150.

In the embodiment illustrated in FIG. 7B, a friction sheet F" may include a pair of side portions FS arranged at positions adjacent to the side surfaces SI of the battery cell C and may be formed in a stripe pattern including the pair of side portions FS extending in parallel at positions adjacent to the side surfaces SI of the battery cell C without surrounding the main surface M of the battery cell C in a closed form. In this case, the friction sheet F" may be arranged at a position that does not overlap the electrode assembly 150.

In the embodiment illustrated in FIG. 7C, a friction sheet F''' may have an upper portion FU and a bottom portion FB respectively arranged at positions adjacent to the upper surface U and the bottom surface B of the battery cell C and may be formed in a stripe pattern extending in parallel at positions adjacent to the upper surface U and the bottom surface B of the battery cell C without surrounding the main surface M of the battery cell C in a closed form. In this case, the friction sheet F''' may be arranged at a position that does not overlap the electrode assembly 150.

According to one or more embodiments of the present disclosure, a battery pack including a plurality of battery cells reduces an assembly cost and assembly time for assembling a large number of battery cells, while strengthening lateral stiffness and increasing impact resistance against an external impact applied in the transverse direction intersecting the longitudinal direction in which the battery cells are arranged.

It is to be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as set forth by the following claims.

What is claimed is:

1. A battery pack comprising:
   a plurality of battery cells arranged in a longitudinal direction;
   a heat insulating sheet between two adjacent battery cells of the plurality of battery cells;
   a first friction sheet located between the heat insulating sheet and a first battery cell of the two adjacent battery cells and comprising non-adhesive surfaces in direct contact with the heat insulating sheet and the first battery cell so as to form a frictional bond with the heat insulating sheet and the first battery cell, respectively;
   a second friction sheet located between the heat insulating sheet and a second battery cell of the two adjacent battery cells so as to form a frictional bond with the heat insulating sheet and an adhesive bond with the second battery cell; and
   a restrainer configured to provide a compressive force in the longitudinal direction from opposite ends of the plurality of battery cells, wherein the compressive force affects each of a frictional bonding strength between the first friction sheet and the first battery cell and a frictional bonding strength between the first friction sheet and the heat insulating sheet, the frictional bonding strength between the first friction sheet and the first battery cell being proportional to the compressive force so as to maintain the first friction sheet and the first battery cell against relative movement in a transverse direction intersecting the longitudinal direction, and the frictional bonding strength between the first friction sheet and the heat insulating sheet being proportional to the compressive force so as to maintain the first friction sheet and the heat insulating sheet against relative movement in the transverse direction intersecting the longitudinal direction, wherein a friction coefficient between the first friction sheet and the heat insulating sheet is in a range of 0.2 to 0.8, and wherein a friction force between the first friction sheet and the first battery cell is in a range of 400 N to 4000 N.

2. The battery pack of claim 1, wherein the second friction sheet comprises a non-adhesive surface in direct contact with the heat insulating sheet and an adhesive surface facing the second battery cell.

3. The battery pack of claim 2, wherein the first friction sheet and the second friction sheet are alternately arranged in an alternating order in the longitudinal direction.

4. The battery pack of claim 2, wherein the first friction sheet and the second friction sheet are between the two adjacent battery cells, the first friction sheet is between the heat insulating sheet and the first battery cell, and the second friction sheet is between the heat insulating sheet and the second battery cell.

5. The battery pack of claim 2, further comprising an adhesive member between the second friction sheet and the second battery cell.

6. The battery pack of claim 1, wherein the first friction sheet comprises a central opening and an edge portion around the central opening.

7. The battery pack of claim 6, wherein the edge portion has a closed shape surrounding the central opening.

8. The battery pack of claim 6, wherein the first battery cell comprises an electrode assembly and a casing member configured to accommodate the electrode assembly, and the casing member comprises an upper surface on which an electrode terminal electrically connected to the electrode assembly is located, a bottom surface opposite to the upper surface, a pair of main surfaces connecting the upper surface to the bottom surface, and a pair of side surfaces that connect the upper surface to the bottom surface and are narrower than the pair of main surfaces.

9. The battery pack of claim 8, wherein the edge portion of the first friction sheet faces a first main surface of the pair of main surfaces of the casing member and extends along edges of the first main surface of the pair of main surfaces.

10. The battery pack of claim 9, wherein the edge portion of the first friction sheet comprises an upper portion at a position adjacent to the upper surface of the casing member, a bottom portion at a position adjacent to the bottom surface of the casing member, and side portions at positions adjacent to the pair of side surfaces of the casing member.

11. The battery pack of claim 10, wherein the upper portion and the side portions of the edge portion are located so as not to overlap the electrode assembly, and the bottom portion of the edge portion is located to overlap the electrode assembly.

12. The battery pack of claim 11, wherein an upper portion and side portions of the electrode assembly are located to overlap the central opening of the first friction sheet.

13. The battery pack of claim 1, wherein a friction coefficient between the first friction sheet and the first battery cell is in a range of 0.2 to 0.8.

14. The battery pack of claim 1, wherein the first friction sheet comprises at least one of silicone, polyurethane, thermoplastic polyurethane (TPU), and a pressure sensitive adhesive (PSA).

15. The battery pack of claim 1, wherein the second friction sheet comprises a non-adhesive surface in direct contact with the heat insulating sheet and an adhesive surface facing the second battery cell, wherein the first friction sheet and the second friction sheet are formed of a same material and have a same shape.

16. The battery pack of claim 1, wherein the heat insulating sheet faces an entire main surface of the first battery cell.

17. The battery pack of claim 1, wherein the heat insulating sheet comprises one of mica and aerogel.

18. The battery pack of claim 1, wherein the restrainer comprises plates surrounding the plurality of battery cells arranged in the longitudinal direction.

19. The battery pack of claim 18, wherein the plates comprise a pair of end plates arranged outside outermost battery cells of the plurality of battery cells in the longitudinal direction, and a pair of side plates extending in the longitudinal direction to connect the pair of end plates to each other.

20. The battery pack of claim 19, wherein the compressive force provided by the restrainer in the longitudinal direction is in a range of 2000 N to 5000 N.

* * * * *